Figure 1:
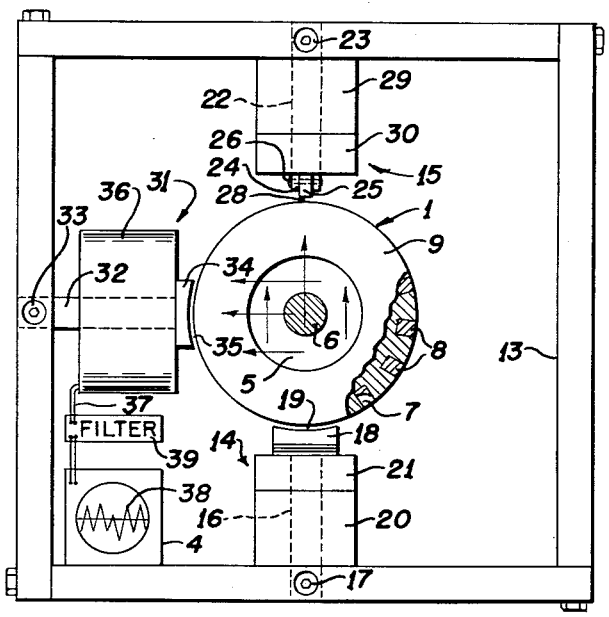

Sept. 12, 1961 W. L. PROBERT 2,999,981
APPARATUS FOR TESTING DEFECTS IN METAL MEMBERS
Filed Jan. 14, 1959

INVENTOR.
WALTER L. PROBERT
BY
Andrus & Starke
Attorneys

United States Patent Office 2,999,981
Patented Sept. 12, 1961

1

2,999,981
APPARATUS FOR TESTING DEFECTS IN METAL MEMBERS
Walter L. Probert, Wauwatosa, Wis., assignor to A. O. Smith Corporation, Milwaukee, Wis., a corporation of New York
Filed Jan. 14, 1959, Ser. No. 786,784
7 Claims. (Cl. 324—34)

The present invention is directed to apparatus for testing metal members for defects and is particularly directed to apparatus for testing of aluminum cast squirrel-cage rotors or the like having a series of moving interconnected electrical conductors.

Induction motors and generators are constructed with a squirrel-cage type rotor as the rotating component. The rotor includes a cylindrical laminated rotor core which is provided with a plurality of axially extending and circumferentially spaced winding slots. Solid rotor bars are disposed within the winding slots and are secured at opposite ends to conducting end rings to establish a short circuit between the several rotor bars.

The most widely employed rotor bar construction is die cast aluminum. In accordance with conventional methods, the aluminum bars and axial end rings are die cast directly into the winding slots and suitable confining dies which define the end rings. As the aluminum rotor bars cool, the bars shrink and break away from the adjacent rotor surface to effectively insulate the rotor bars from the rotor core. The conductivity of the aluminum is so much greater than that of the core that the current is effectively concentrated within the aluminum rotor bars.

In all practical die-casting methods employed in the production of rotors for induction motors and generators, gas is liberated and may be trapped within the cast rotor bars or create blow holes within the rotor bar. Also, the cast rotor bar may not shrink sufficiently to completely break away from the core and may in fact be cast thereto. The rotor bar is then effectively shorted to the core and current may flow into the core member. Non-uniformity in the composition of the aluminum in the rotor bars and the end rings is also a common defect in commercial construction. All such defects cause excessive resistance in the rotor bar structure and adversely affect the operation of the motor.

Automatic inspection of the rotor for such defects has been proposed wherein the rotor is rotated in an alternating magnetic field and the effect of broken and defective bars on the magnetic field is detected. The wave shape of the current in the field or test winding creating the main field is generally an alternating current signal of constant amplitude for a series of sound rotor bars and end rings. A defective rotor bar distorts the wave shape of the main signal current and establishes a noticeable change in the amplitude of the output signal. However, the core losses in the apparatus constitute noticeable load on the drive motor and the testing units are restricted to inspection of one rotor size.

In accordance with the present invention, a relatively rugged testing device is provided having means to allow easy adjustment for different diameter rotor and establishing relatively no load on the driving motor.

In accordance with the present invention a direct current field is established between a pair of pole members suitably spaced to allow rotation of a rotor therebetween. One of the poles comprises a very narrow pole face approximating the circumferential width of one rotor bar. The opposite pole member has a pole fact substantially in excess of the circumferential width of one rotor bar. A rotor which is rotated between the pole members establishes a cross flux which is proportional to the current induced in the rotor bar passing beneath the narrow pole.

A magnetic responsive means is mounted to detect the changes in the cross flux directly or the resultant main field as modified by the cross flux.

A signal coil assembly is preferably supported at 90° to the narrow pole member. The signal coil assembly includes a relatively small diameter pole member terminating in a relatively broad circumferential pole face immediately adjacent the rotor to simultaneously cover a plurality of the distributed rotor bars. A suitable signal coil is wound about the signal pole member to respond to the cross flux established by the circulating currents in the rotor bar structure.

A uniform rotor cage structure produces a uniform cyclic changing cross flux and a uniform cyclic output signal within the signal coil. A defective rotor bar distorts the cross flux and establishes a distorted output signal within the continuous train of signals.

A signal detecting device is connected to the output of the signal coil which establishes a series of signals corresponding to the number of rotor bars for each revolution of the rotor. Each individual rotor bar thus establishes a signal at a preselected location within the series of individual signals to clearly and positively identify a defective bar.

Minor defects in the end rings do not appreciably affect the operation of the rotor and are not noticeable in the output from the signal coil. However, broken end rings or end rings having abnormally large voids or entrapped gas do adversely affect the functioning of the rotor. Such end ring defects cause the envelope of the output signal to change cyclically and indicate the defects.

The present invention provides a simple and reliable apparatus which is readily adapted for shop and production testing of cast squirrel-cage rotors and the like.

The drawing furnished herewith illustrates the best mode presently contemplated for carrying out the invention.

Figure 2:
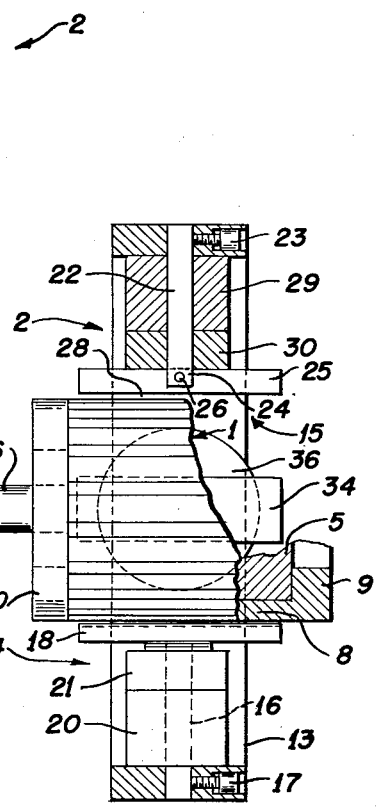
Figure 2:
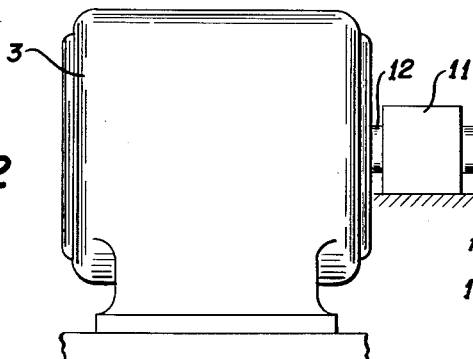
Figure 3:
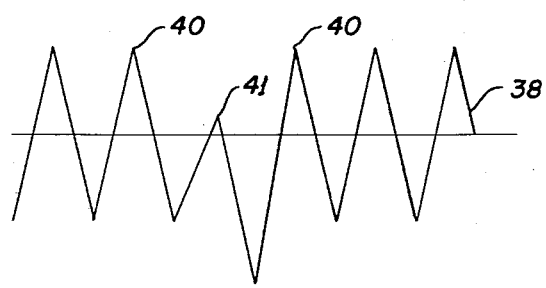

In the drawing:
FIGURE 1 is a front elevational view of a rotor testing apparatus having a rotor rotatably supported in position for testing;
FIGURE 2 is a view from the left of FIG. 1 with parts broken away and sectioned to show details of construction, and
FIGURE 3 is a typical illustrative output signal of the testing unit for a rotor having a defective rotor bar.

Referring to the drawings, and particularly to FIGS 1 and 2, a cylindrical squirrel-cage type rotor 1 is mounted within a rotor bar testing unit 2. A drive motor 3 is coupled to the rotor 1 and adapted to rotate the rotor which movement results in output signals from the testing unit indicative of the soundness of the construction of rotor 1. An oscilloscope detector 4 is connected to the output of the testing unit 2 and establishes a visual representation reflecting the soundness or faultiness of the rotor 1.

The illustrated rotor 1 is a conventional cast aluminum squirrel-cage type rotor. Rotor 1 includes a laminated cylindrical core 5 which is concentrically secured to a supporting shaft 6. A plurality of axially extending winding slots 7 are circumferentially distributed about the outer periphery of the core 5. Aluminum rotor bars 8 are cast in the winding slots 7 and joined by integrally cast aluminum end rings 9 and 10 into the conventional squirrel cage winding. The end rings 9 and 10 are disposed at axially opposite ends of the laminated core 5 and join the corresponding ends of the cast aluminum rotor bars 8.

The cast rotor bars 8 must be formed substantially without holes and entrapped gases. The latter defects substantially increase the resistance of the rotor bars and adversely affect the operation and functioning of a dynamo-electric machine.

Although minor defects in the end rings 9 and 10 do not appreciably adversely affect the rotor operation, broken end rings and major voids and entrapped gas pockets do and such rotors should also be rejected.

In accordance with the present invention, rotors are readily and automatically checked for defective rotor bars 8 and end rings 9 and 10 to insure the use of only high quality and reliable rotors in motors and the like.

In accordance with the illustrated embodiment of the invention, a suitable bearing and coupling assembly 11 connects the output shaft 6 of rotor 1 to an output shaft 12 of motor 3. The motor 3 is a suitable constant speed variety which drives the rotor 1 at a predetermined constant speed within the testing unit 2.

The rotor bar testing unit 2 includes a square magnetic frame 13 which is formed of a solid high magnetically permeable material to serve as a supporting structure and a magnetic yoke. A pair of exciting pole assemblies 14 and 15 are secured respectively to the lower and upper portions of the square frame 13. The exciting pole assemblies 14 and 15 establish a vertically directed magnetic field, shown diagrammatically by vertical arrows, in which the rotor 1 is caused to rotate.

The lower exciting pole assembly 14 includes a vertically upstanding pole bolt 16 which is releasably secured in a corresponding opening in the base portion of frame 13 by a small set screw 17. The pole bolt 16 terminates in a solid magnetic pole member 18 having an axial length corresponding to the axial length of the rotor 1 such that the pole member extends coextensively with the rotor bars 8. The strength of the magnetic field resulting from assembly 14 is proportional to the length of the pole member 18. Consequently, the member 18 is preferably coextensive with the rotor, as shown. The face of magnetic pole member 18 adjacent the circumference of rotor 1 is correspondingly arcuately shaped to establish a constant air gap 19 between the facing surfaces of pole member 18 and rotor 1. A permanent magnet 20 encircles the pole bolt 16 between the frame 13 and the pole member 18 to establish the direct magnetic field in the pole assembly 14 and the rotor 1. The magnetic field is assumed, for purposes of illustration, as being polarized upwardly through the assembly 14 and across rotor 1. The field returns to the magnetic assembly 14 through the assembly 15 and the magnetic frame 13.

Suitable spacing members 21 are disposed between the pole 18 and the magnet 20 to establish a rigid structure which readily withstands the forces established by the magnetic field and the operation of the driving motor 3.

The upper exciting pole assembly 15 includes a pole bolt 22 which is secured within the upper portion of frame 13 by a set screw 23 in the same manner as bolt 16. The pole bolt 22 terminates in a generally U-shaped end 24 extending parallel to the axis of the rotor. A narrow bar-like pole member 25 is disposed within the U-shaped end 24 of the pole bolt 22 and extends axially coextensively with the rotor bars 8. A rivet 26 or the like passes through aligned openings in the arms of the U-shaped end 24 and the pole member 25 to rigidly secure the pole member 25 in place. The pole member 25 is mounted and located to establish an air gap 28 corresponding in size to air gap 19.

The pole member 25 is formed of a highly magnetically permeable material and has a circumferential width essentially corresponding to the circumferential width of each of the similar rotor bars 8. Consequently, the flux of the magnetic field shown by the generally vertical arrows is concentrated through the then aligned rotor bar 8.

A permanent magnet 29 encircles the pole bolt 22 and is polarized to aid the magnetic field established by the magnet 20 and thereby establishes a preselected magnetic field between the upper and the lower pole assemblies 14 and 15.

A suitable spacer 30 is disposed between the permanent magnet 29 and the pole member 25 to establish a rigid structure.

The permanent magnets 20 and 29 establish a constant magnetic field between the poles 18 and 25. The rotation of the rotor 1 within the permanent field induces voltages in the rotor bars 8. Because the rotor bars 8 are short circuited by the end rings 9 and 10, circulating currents are established in the rotor bars in the conventional manner. These circulating currents establish a magnetic cross flux or field which is generally polarized ninety degrees with respect to the main field, as diagrammatically shown by horizontal arrows in FIG. 1.

The magnitude of the currents is proportional to the resistivity of the rotor bars 8. Voids and similar defects in the rotor bars 8 increase the resistance of the rotor bars and consequently change the magnitude of the cross magnetic field.

A signal coil assembly 31 is secured to a side portion of frame 13 to detect the changes in the magnetic cross field.

The signal coil assembly 31 includes a horizontally extending pole bolt 32 which is releasably secured within a central opening in the center of a side portion of the square frame 13 by a set screw 33. The pole bolt 32 is arranged midway between the main field poles 18 and 25 and essentially at 90° to the main field poles. The pole bolt 32 terminates in generally rectangularly shaped pole member 34 which extends generally coextensively with the rotor bars 8.

The pole face of pole member 34 immediately adjacent the rotor 1 is arcuately shaped generally in accordance with rotor 1 and located to establish a constant air gap 35. The circumferential width of pole member 34 is equal to several of the individual rotor bars.

A signal coil 36, consisting of a large number of turns of fine wire, encircles the pole bolt 32. The cross field flux which is concentrated by the pole member 34 into the pole bolt 32 links the signal coil 36 and consequently, any variation in the magnetic cross field results in a corresponding voltage signal induced in the signal coil. The output signal is consequently a relatively constant amplitude alternating signal for a series of rotor bars 8 connected in corresponding equal resistive circuits. However, a defective rotor bar 8 increases the resistance to the corresponding circulating currents and distorts the output signal more or less in proportion to the character of the defect.

A pair of leads 37 connect the output of the signal coil 36 in circuit with the input side of the oscilloscope detector 4 to provide a visual trace 38 of the signals induced in the signal coil. The current trace 38 shown substantially enlarged in FIG. 3, is employed to check the rotor for the location of any defective rotor bars or end rings.

A filter circuit 39, shown in block diagram, is connected between the output to signal coil 36 and the input to the oscilloscope detector 4. The filter circuit 39 is constructed with a low pass portion, not separately shown, to pass electrical signals approximately equal to a frequency corresponding to the angular velocity of the rotor times the number of bars. Signals of a much higher frequency which are induced in the signal coil 36 as a result of mechanical vibrations, pulsations of the drive and the like are blocked from passage to the scope 38.

Stray magnetic flux from the drive motor and other adjacent electrical apparatus under test establish in coil 36 spurious signals of a frequency corresponding to the incoming 60 cycle power system conventionally employed, the filter circuit 39 includes a 60 cycle rejection portion, not shown in detail, in addition to the low pass portion to minimize the effects of these stray fluxes.

The operation of the illustrated rotor bar tester is summarized as follows:

A rotor 1 is mounted in place and the rotor shaft 6 is secured to the motor shaft 12 by the coupling 11. The motor 3 is energized to rotate the rotor 1 within the permanent magnetic field established between the main field assemblies 14 and 15. The main flux is concentrated through the rotor bars 8 immediately adjacent the air gaps 19 and 28 by the respective pole members 18 and 25. As the rotor bars 8 cut the concentrated flux, currents are established in the corresponding rotor bars. The currents are a function of the flux density and of the length and velocity of the rotor bars. The circulating currents create the magnetic cross field which is angularly displaced substantially 90° from the main field and is generally on the cross axis of the rotor 1. The magnetic cross field is concentrated through the signal coil 36 by the pole member 34 and the pole bolt 32. The changing cross field induces a voltage in the signal coil 36 which voltage is proportional to the rate of change of the field.

As each bar sweeps past the narrow pole member 24, a uniformly changing signal is induced in the signal coil 36. A uniform rotor cage therefore produces a series of similar cyclic output signals.

Referring particularly to FIG. 3, a typical distortion of an output signal 38 which is due to a defective rotor bar is shown. Each peak 40 is related to a particular rotor bar 8. The sound rotor bars establish like peaked signals. However, a defective rotor bar 8 establishes an offset peaked signal 41 having a noticeable foreshortened wave front. Therefore, by suitable synchronism of the rotation of rotor 1 and oscilloscope 4, defective rotor bars 8 are rapidly and accurately located.

The combination of the broad faced pole member 18 and the narrow face pole member 25 makes the output signal of coil 36 particularly dependent upon the current induced in the rotor bar 8 immediately aligned with the narrow faced pole member 25. The broad faced pole member 18 distributes the magnetic field across a plurality of rotor bars and consequently the effect of the resistance of any one rotor bar is reduced. The narrow faced pole member 18 concentrates the field into a single bar and the effect of the resistance of the corresponding bar is very great. Consequently, a defective rotor bar 8 passing beneath the pole member 25 appreciably changes the cross field when compared to the cross field of a sound rotor bar. However, the same defective rotor bar only inappreciably affects the cross field while passing the broad faced pole member 18. The offset peaks 41 are therefore identified with a particular rotor bar 8 by synchronizing the operation of the oscilloscope 4 with angular velocity of the rotor 1 to repetitively establish a series of electrical signals for each complete rotation of rotor 1.

As previously discussed, only substantial defects in the end rings 9 and 10 require correction or rejection of the rotor. Such end ring defects would also cause an appreciable cyclic change in the envelope or outline of the cross field and the resulting output signal from signal coil 36.

In conventional squirrel-cage type rotors, the rotor bars 8 do not extend precisely parallel to the axis of the rotor but are skewed to dispose the longitudinal axis of the rotor bar extending slightly circumferentially about the rotor. The narrow pole member 25 may be correspondingly skewed to give sharp discrimination between adjacent rotor bars. However, the narrow pole member 25 must then be individually formed for different diameter rotor.

The testing apparatus 2 may be adjusted for various diameter rotors by changing the position of the respective pole bolt members 16 and 22 of the coil assemblies 14 and 15. The corresponding spacing members 21 and 30 would preferably be changed accordingly to maintain a rigid assembly. The slight deformation in the air gaps formed by the pole members and the rotor 1 does not appreciably change the functioning of the apparatus.

The salient pole structure of the present invention establishes a high density magnetic field over a relatively small area. Consequently, the core losses which arise in the core 5 of the rotor 1 are relatively inconsequential and do not noticeably load the motor 3.

Rotors may also be mounted on a dummy shaft and inspected prior to assembly with the rotor shaft in accordance with this invention. Rejection of a rotor does not then include loss of a shaft and the resultant additional expense.

Although the signal coil 36 is shown in the preferred location, the coil may also be disposed directly on one of the main pole assemblies 14 and 15 or on a separate intermediately disposed pickup assembly. The coil would then detect the net distorting result of a defective rotor bar 8 upon the main field established between pole members 18 and 25. However, in practical construction, the preferred central location of the coil allows more ready and simpler winding and supporting of the signal coil.

The present invention provides a simple and rugged inspection device which is adapted for shop and production line use.

Various modes of carrying out the invention are contemplated as being within the scope of the following claims particularly pointing out and distinctly claiming the subject matter which is regarded as the invention.

I claim:

1. A detection unit adapted to inspect like successive circumferential areas of a magnetic member, which comprises a main field structure having a pair of spaced magnetic pole means spaced to allow movement of said magnetic member therebetween to establish a magnetic cross field, one of said pole means having a circumferential span generally corresponding to one of said successive areas and the other of said pole members having a circumferential span equal to at least two of said successive areas, and a detector arranged to respond to a change in the magnetic cross field resulting from movement of the magnetic member between the pole means to establish an output proportional to the characteristic of said successive areas of said moving magnetic member.

2. An inspection device to automatically inspect the circumferentially distributed rotor bars of a squirrel-cage induction rotor, which comprises a pair of spaced magnetic pole means spaced to define a direct current magnetic field within which the rotor is rotated, one of said pole means having a pole surface having a circumferential span generally corresponding to one of said rotor bars immediately adjacent the circumference of the rotor, the other of said pole means including pole surface having a circumferential span encompassing a pair of adjacent rotor bars and a pair of spaced core areas, and an electromagnetic detector mounted to respond to a change in the magnetic cross field incident to rotation of the rotor within said direct current magnetic field.

3. A rotor bar tester for inspecting the circumferentially distributed rotor bars of a squirrel-cage rotor, which comprises a pair of salient pole assemblies disposed in spaced relation and defining a magnetic field within which the rotor is rotated, one of said salient pole assemblies having a pole face corresponding generally to the circumferential width of the individual rotor bars, the other of said salient pole assemblies having a pole face at least equal to the circumference spanned by two of said rotor bars, a connecting yoke extending circumferentially of the rotor and connected to said salient pole assemblies, and a coil assembly secured to said yoke and having a pole face positioned circumferentially between said pair of pole assemblies and responsive to the magnetic cross field established incident to rotation of the rotor in the magnetic field.

4. A rotor bar tester for inspecting the circumferentially distributed rotor bars of a squirrel-cage rotor, which comprises a magnetic frame, a pair of pole assemblies secured to said frame in spaced relation to each other and defining a magnetic field within which the rotor is rotated, each of said pole assemblies including a magnetic pole bolt terminating in a pole member extending axially of the rotor, one of said pole members having a pole face corresponding generally to the circumferential width of the individual rotor bars and the opposite pole member having a pole face equal to at least two of said rotor bars, direct current magnet means encircling each of said pole bolts to establish the magnetic field between the pole members, and a coil assembly having a pole bolt secured to the frame intermediate said pole assemblies and a pole member encompassing a plurality of said rotor bars and having a signal coil responsive to the magnetic cross field established incident to rotation of the rotor in the magnetic field.

5. A rotor bar tester for inspecting the circumferentially distributed rotor bars of a squirrel-cage rotor and the like, which comprises a magnetic frame, a pair of main field salient pole assemblies secured to said magnetic frame in opposed relation to establish a direct current magnetic field, each of said pole assemblies including a pole bolt terminating in a pole member and a direct current magnet encircling the pole bolt, means to releasably attach the pole bolt to the magnetic frame to allow selective changes in the spacing of the pole members for different diameter rotors, and a signal coil assembly secured to the magnetic frame generally centrally of the main field salient pole assemblies and responsive to the changing cross field established incident to rotation of a rotor within the direct current magnetic field.

6. A rotor bar tester for inspecting the circumferentially distributed rotor bars of a squirrel-cage rotor and the like, which comprises a magnetic frame, a pair of main field salient pole assemblies secured to said magnetic frame in opposed relation to establish a direct current magnetic field, each of said pole assemblies including a pole bolt terminating in a pole member and a direct current magnet encircling the pole bolt, means to releasably attach the pole bolt to the magnetic frame to allow selective changes in the spacing of the pole members for different diameter rotors, a signal coil assembly having a pole bolt terminating in a pole member and having a signal coil wound upon the pole bolt, and means to releasably secure the pole bolt of the signal coil assembly to the magnetic frame generally centrally of the main field salient pole assemblies.

7. A detection unit adapted to inspect like successive circumferential areas of a magnetic member, which comprises a main field structure having a pair of spaced magnetic pole means spaced to allow movement of said magnetic member therebetween to establish a magnetic cross field, one of said pole means having a circumferential span generally corresponding to one of said successive areas and the other of said pole members having a circumferential span equal to at least two of said successive areas, a signal pickup arranged to respond to a change in the magnetic cross field incident to movement of the magnetic member between the pole means to establish an output proportional to the characteristic of the successive areas of the magnetic member, a recorder connected to the signal pickup to record the output of the pickup, and a filter connected between the signal pickup and the recorder to pass a signal corresponding to the frequency of movement of the magnetic member and to block extraneous signals induced in the signal pickup.

References Cited in the file of this patent

UNITED STATES PATENTS

| | | |
|---|---|---|
| 2,640,100 | Packer et al. | May 26, 1953 |
| 2,877,406 | Hockschild | Mar. 10, 1959 |
| 2,924,773 | Lykke | Feb. 9, 1960 |

UNITED STATES PATENT OFFICE
CERTIFICATE OF CORRECTION

Patent No. 2,999,981            September 12, 1961

Walter L. Probert

It is hereby certified that error appears in the above numbered patent requiring correction and that the said Letters Patent should read as corrected below.

Column 1, line 68, for "fact" read -- face --; column 4, line 46, for "lesss" read -- less --; line 55, for "to", first occurrence, read -- of --.

Signed and sealed this 10th day of April 1962.

(SEAL)
Attest:

ERNEST W. SWIDER

Attesting Officer

DAVID L. LADD
Commissioner of Patents